United States Patent [19]

Doty et al.

[11] Patent Number: 5,301,893
[45] Date of Patent: Apr. 12, 1994

[54] SEAT BELT RETRACTOR HAVING A NOISE SUPPRESSION MECHANISM WITH A BLOCKOUT CAM

[75] Inventors: Gerald A. Doty, Crown Point, Ind.; William G. Drinane, New Lenox, Ill.

[73] Assignee: Takata Inc, Auburn Hills, Mich.

[21] Appl. No.: 935,006

[22] Filed: Aug. 25, 1992

[51] Int. Cl.⁵ .............................................. B60R 22/40
[52] U.S. Cl. .............................................. 242/107.4 A
[58] Field of Search ................. 242/107.4 A, 107.4 B, 242/107.4 D; 280/806; 297/478, 480

[56] References Cited

U.S. PATENT DOCUMENTS

| | | | |
|---|---|---|---|
| 3,550,875 | 12/1970 | Settimi | 242/107.4 D |
| 3,862,726 | 1/1975 | Ulrich et al. | 242/107.4 |
| 4,220,294 | 9/1980 | DiPaola | 242/107.4 A |
| 4,509,706 | 4/1985 | Thomas | 242/107.4 A |
| 4,570,873 | 2/1986 | Kurtti | 242/107.4 A |
| 4,607,805 | 8/1986 | Burghardt | 242/107.4 A |
| 4,749,142 | 6/1988 | Saito | 242/107.4 R |
| 4,834,313 | 5/1989 | Tsukamoto | 242/107.4 A |
| 4,993,656 | 2/1991 | Tsuge et al. | 242/107.4 A |
| 5,022,601 | 6/1991 | Saitou et al. | 242/107.4 A |

FOREIGN PATENT DOCUMENTS 0359960 3/1990 European Pat. Off. ..... 242/107.4 A Primary Examiner—John M. Jillions
Attorney, Agent, or Firm—Fitch, Even, Tabin & Flannery

[57] ABSTRACT

In accordance with the present invention, there is provided a noise suppression mechanism for a seat belt retractor used in a vehicle. The preferred retractor includes a reel journaled on a reel shaft and having attached a ratchet wheel with ratchet teeth. The ratchet teeth may be engaged by a pivotally frame-mounted locking pawl. The pawl may pivot between an inoperative position in which the pawl is spaced from the ratchet wheel and an operative position in which an inertial device urges the pawl into engagement with the ratchet wheel to prevent protraction of the belt. The preferred noise suppression mechanism may include an interlocking disc being mounted on reel shaft for rotation with the ratchet wheel for rotating between an actuated position for immobilizing the locking pawl against rattling and a neutral position allowing the locking pawl to pivot freely. The disc may have a blockout cam having a curved engaging surface for engaging a pawl being spaced at different positions with respect to the ratchet wheel. A spring may be employed for uniformally biasing the disc into engagement with the ratchet wheel. The disc has predetermined rotation for preventing interference with the other retractor components and for ensuring effective application of the blockout cam for engaging the pawl for immobilizing the pawl.

6 Claims, 2 Drawing Sheets

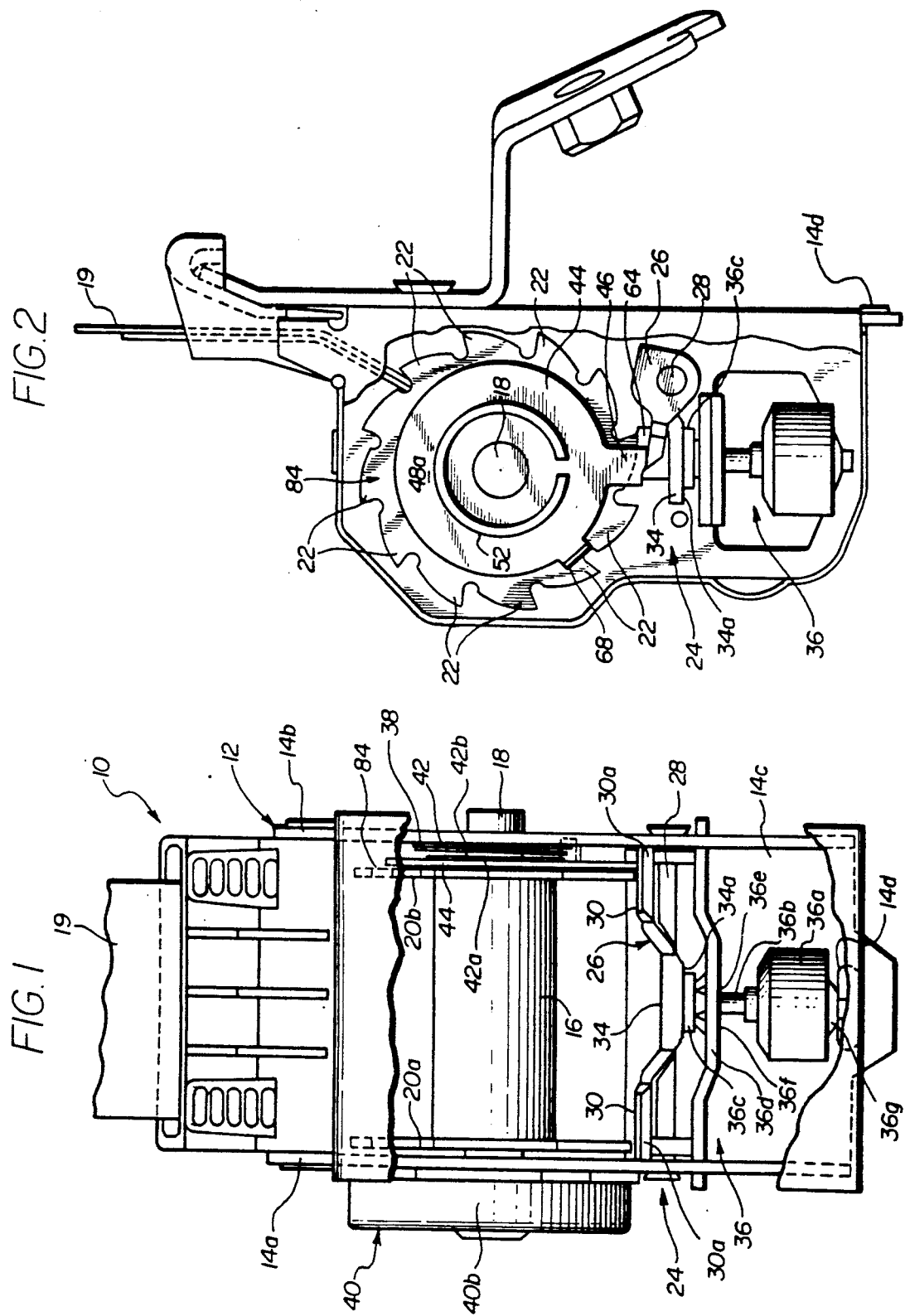

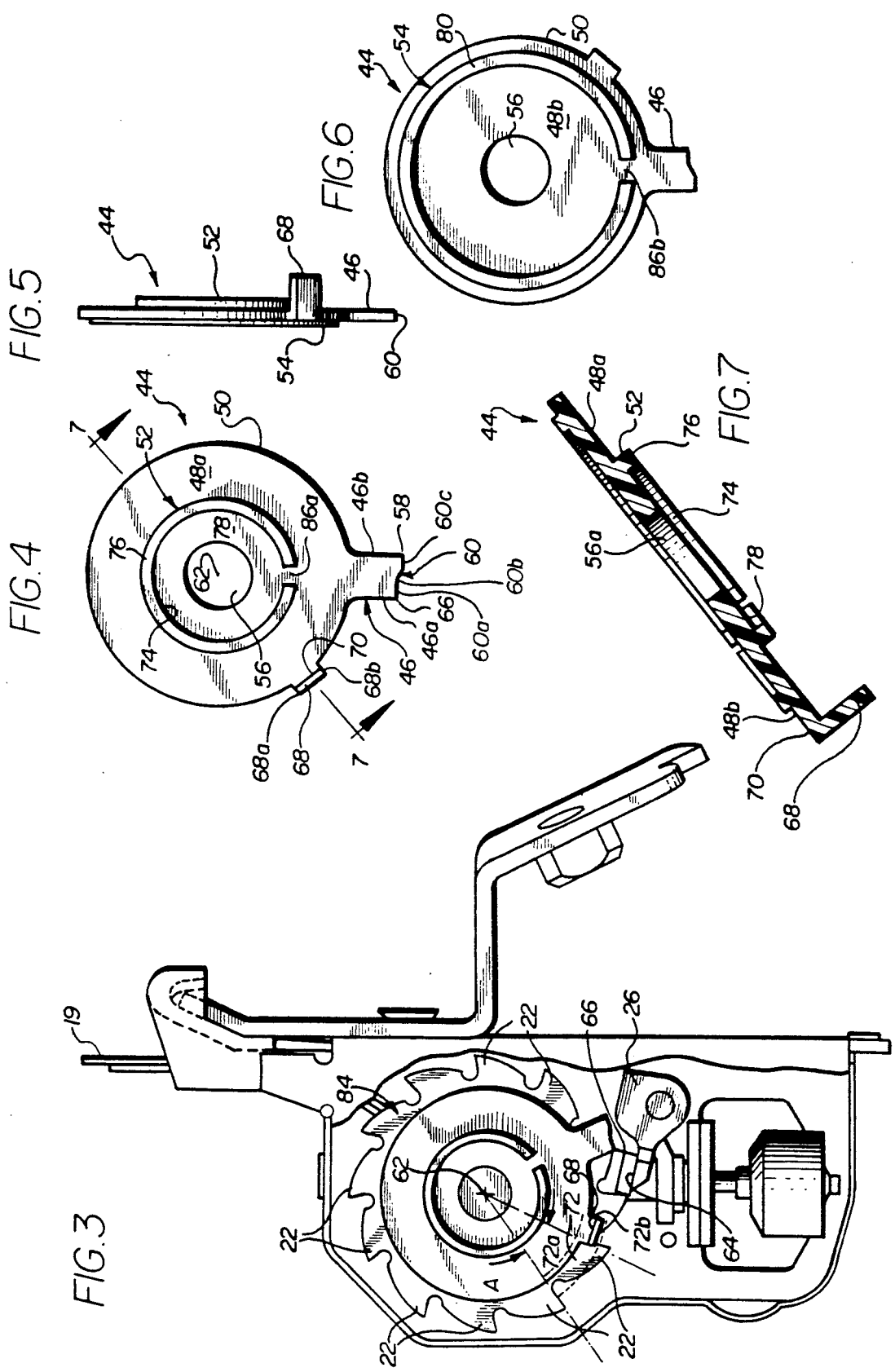

SEAT BELT RETRACTOR HAVING A NOISE SUPPRESSION MECHANISM WITH A BLOCKOUT CAM

FIELD OF THE INVENTION

This invention relates to seat belt retractors for vehicles, and more particularly to a noise suppression mechanism for quieting the rattle occasioned by free movement of components, such as a frame-mounted ratchet pawl, common to many such retractors.

BACKGROUND OF THE INVENTION

A wide variety of seat belt retractors have been developed for preventing belt protraction during periods of rapid acceleration or deceleration of a vehicle. Many of these seat belt retractors include a reel, upon which a seat belt is wound, having a ratchet wheel with teeth for being engaged by a pivotally frame-mounted pawl. The pawl is normally biased in a non-engaging position in which the pawl is spaced from the ratchet wheel, and for preventing belt protraction, the pawl is commonly actuated into engagement with the ratchet wheel by an inertial mechanism operating in response to such periods of rapid acceleration or deceleration of the vehicle.

However, during vehicle operation periods of constant speed or modest acceleration or deceleration, the pawl is typically biased, such as by gravity, to its non-engaging position with respect to the ratchet wheel, and hence, the pawl is free to pivot to abut the ratchet wheel in response to any vehicle vibration. Since the pawl and ratchet wheel are typically formed from metal, this abutment produces a rattle which may be disturbing to the driver and passengers and to those who are called upon to identify such rattle.

For many applications, however, it is desirable that seat belt retractors be provided with a noise suppression mechanism to quiet any such noise or rattle occasioned by such free movement of the pawl into the ratchet wheel during normal vehicle operation.

In this connection, much effort has been directed toward developing fail-safe noise suppression mechanisms that do not adversely affect the operation of the retractor's components, such as any emergency locking mechanisms employed for actuating the pawl into the ratchet wheel for preventing belt protraction. It also is important that these noise suppression mechanisms are capable of being cycled to insure their ability to operate under adverse conditions, and of meeting the requisite safety code specifications of the government and of the particular installer of such retractor.

The disadvantage of some noise suppression mechanisms intended to quiet the rattle occasioned by free movement of the pawl is either their tendency to adversely affect the operation of any emergency locking mechanism, such as an inertial mechanism, their inability to effectively cooperate with an emergency locking retractor employing an inertial mechanism and, in many applications, their tendency to render the retractor too large, complex and/or expensive.

The present invention pertains to a fail-safe, cost effective noise suppression mechanism which is sized accordingly so to be completely self-contained within an emergency locking retractor employing an inertial mechanism. The noise suppression mechanism is formed of relatively few and simple parts making it very cost effective.

As known in the art, it is common for noise suppression mechanisms to include some type of blockout means for engaging the pawl to space it from the teeth of the ratchet wheel. One example of such attempts is U.S. Pat. No. 4,220,294 to DiPaola which utilizes a flexible means for spacing the pawl from the ratchet teeth. A disadvantage with employing this flexible means is that it remains in constant contact with the pawl during normal operation and, as a result, tends to lessen the sensitivity of the pawl to the actuator or inertial mechanism. Thus, this type of noise suppression mechanism may render retractors unsafe due to its inability to freely respond to the inertial mechanism.

In response, efforts have been made to space the pawl from the ratchet wheel in seat belt retractors without lessening the sensitivity of the pawl to the inertial mechanism. Such attempts include using a rotational force generated from the protraction of the belt. The rotational force is captured, via a friction spring, to pivot a lever into an operative position to space the pawl out of engagement with the ratchet wheel. Examples of such retractors are shown in U.S. Pat. No. 4,749,142 to Saitow, U.S. Pat. No. 4,993,656 to Tsuge et al. and U.S. Pat. No. 5,002,601 to Saitou et el. A disadvantage with these mechanisms is that the lever is only being actuated when the rotational force is generated during belt retraction. This is generally undesirable because during much of the time when the vehicle is under normal operation the seat belt is not being retracted, and thus, there is no rotational force being generated.

Another known retractor responding to belt protraction is disclosed in U.S. Pat. No. 3,862,726 to Ulrich et al. as including a blockout means being actuated to immobilize a pawl against engagement with the ratchet wheel during belt protraction. This patent discloses a blockout means on a disc which rotates in response to belt protraction and retraction to rotate between an operative position and an inoperative position. A disadvantage with this design is that the blockout means is designed for a retractor in which the pawl is continuously biased into engagement with the ratchet wheel and which includes an inertial mechanism responsive only to rapid accelerated belt protraction and not to rapid acceleration or deceleration of the vehicle.

It is further noted that there have been found in the art other applications of discs being similarly rotatable with the ratchet wheel. However, these discs have been used primarily to actuate automatic locking mechanisms in retractors and do not contemplate the present considerations relating quieting retractors utilizing emergency locking mechanisms in which an importance exists to not adversely affect any such emergency locking mechanism.

There is a need for a noise suppression mechanism which operates to block a pawl which is constantly biased out of engagement with the ratchet wheel in a retractor having an inertial mechanism responsive to rapid acceleration and deceleration of the vehicle.

A general object is to provide an emergency locking retractor employing an inertial mechanism with a fail-safe, small, self-contained noise suppression mechanism for immobilizing the pawl and inertial mechanism during periods except when the belt is being protracted as occurs at the time of an accident.

A further object is to provide a noise suppression mechanism which is highly durable, efficient, and cost effective to manufacture, install and operate.

SUMMARY OF THE INVENTION

In accordance with the present invention, there is provided a noise suppression mechanism for a seat belt retractor used in a vehicle. The preferred mechanism may be employed in a seat belt retractor having a retractor frame in which a reel, upon which a seat belt is wound, is journaled for rotation on a reel shaft. A retractor spring supported from the retractor frame is connected to the reel shaft in a manner which biases the reel in a belt retraction direction and which permits the belt to rotate the reel in a belt protraction direction as it is unwound from the reel.

A ratchet wheel coupled to the reel has ratchet teeth which may be engaged by a pivotally frame-mounted locking pawl. The pawl may pivot between an inoperative position in which the pawl is spaced from the ratchet teeth and an operative position in which the pawl is engaged with the ratchet teeth to lock the reel against rotation in the belt protraction direction.

An inertial device may be provided for actuating the locking pawl in response to a predetermined change in acceleration on the vehicle to pivot the locking pawl to its operative position.

The preferred noise suppression mechanism may include a blocking member in the form of a disc being mounted on the reel shaft for rotation and being movable with the ratchet wheel for rotating between an actuated position for immobilizing the locking pawl against rattling and a neutral position allowing the locking pawl to pivot freely. A spring may be employed for uniformally biasing the disc against the ratchet wheel for engagement. A stop may be provided on the frame to limit the movement of the disc to rotation only through a predetermined range, and the disc may have a blockout portion for engaging the pawl for immobilization when rotated into its actuated position.

The preferred blockout portion may have a curved surface for extending to different depths to reach a pawl which because of manufacturing tolerances may be spaced at different distances from the ratchet wheel in different retractors.

DETAILED DESCRIPTION OF THE DRAWINGS

The present invention will be described in connection with the accompanying drawings, which illustrate the preferred embodiments and details of the invention, and in which:

FIG. 1 is a front elevational view of a seat belt retractor embodying a noise suppression mechanism of the present invention;

FIG. 2 is a right side elevational view of the seat belt retractor of FIG. 1 with the noise suppression mechanism in its operative noise suppression position;

FIG. 3 is a right side elevational view of the seat belt of FIG. 1 with the noise suppression mechanism in its neutral position;

FIG. 4 is a front elevational view of an interlocking disc employed in the noise suppression mechanism;

FIG. 5 is a side elevation view of the interlocking disc of FIG. 4;

FIG. 6 is a back elevational view of the interlocking disc of FIG. 4; and

FIG. 7 is a cross-sectional view taken along line 7—7 of FIG. 4.

DETAILED DESCRIPTION OF THE PREFERRED EMBODIMENT

As shown in the drawings for purposes of illustration, the preferable noise suppression system of the present invention is applied to a seat belt retractor for passenger vehicles. Seat belt retractors, which are now required in all passenger vehicles, have certain basic components, some of which may be a source of annoying rattles caused by vehicle vibration.

With initial reference to FIG. 1 for a general description, the seat belt retractor 10 includes a U-shaped frame 12 having parallel spaced sidewalls or side plates 14a and 14b which are connected by a base portion 14c. The base portion 14c is formed with apertures such as 14d for mounting a cover plate.

Mounted for rotation between the plates 14a and 14b of the frame 12 is a spool or reel 16 upon which a seat belt 19 is wound. The reel 16 has a reel shaft 18 journaled for rotation about its axis in the side plates 14a and 14b. The reel 16 is also provided with ratchet wheels 20a and 20b, which are conventional in form, and include a plurality of ratchet teeth 22 (FIG. 2).

The ratchet wheels 20a and 20b are a part of a ratchet mechanism 24 for preventing protraction of the seat belt 19. The ratchet mechanism 24 also includes a lock bar or locking pawl 26 pivotally mounted, such as on a shaft 28 or the like, in the side plates 14a and 14b for limited pivotal movement. The pawl 26 extends between the side plates 14a and 14b and includes a pair of teeth 30 configured with a sloped surface 30a for adapting the teeth 30 to engage the teeth 22 of the ratchet wheels 20a and 20b to prevent the reel 16 from rotating counterclockwise, as viewed in FIGS. 2.

For the purpose of biasing the locking pawl 26 to a disengaged position in which the pawl is spaced from the ratchet wheels 20a and 20b and also for providing means for operating and actuating the ratchet mechanism 24, the locking pawl 26 includes a central plate portion 34 which is engaged at its transverse midpoint by an inertial mechanism 36. The inertial mechanism 36 is conventional and is intended to actuate the ratchet mechanism 24 in emergency situations, having sudden acceleration or deceleration. That is, the inertial mechanism 36 will activate to pivot the locking pawl 26 into engagement with the ratchet wheels 20a and 20b to prevent any further protraction of the seat belt 19, upon a sudden change in acceleration or deceleration of the vehicle.

The inertial mechanism 36 is a pendulum type mechanism comprising primarily of two elements, a weight 36a and a shaft 36b. The weight 36a is attached at a lower end of the shaft 36b with a press ring 36g. At the opposite end, the shaft 36b includes a disc 36c integrally formed therefrom. The disc 36c enables the weight 36a and the shaft 36b to hang from a support 36d. The shaft 36b extends through an annular opening 36e centrally located about the support 36d, and the disc 36c rests on a tapered annular ring 36f surrounding the opening 36e. The support 36d is attached at its ends to the side plates 14a and 14b, and the tapered annular ring 36f projects above the opening 36e for enabling the weight 36a to swing. For example, when a vehicle suddenly accelerates or decelerates, the weight 36a swings, and the shaft 36b becomes displaced from the vertical. This displacement causes the disc 36c to incline from the horizontal and force the locking pawl 26 to pivot clockwise, with respect to FIG. 2, into engagement with the ratchet teeth 22 of the ratchet wheels 20a and 20b. The structure and function of the inertial mechanism 36 are entirely conventional. Manifestly, the shape and position of the inertia mechanism may be varied from that illustrated herein and fall within the purview of this invention.

For retracting the seat belt 19, a belt retraction mechanism 40 consisting of a spring (not shown), mounted within a housing 40b, is exteriorly mounted on the left-hand side of the retractor 10 on side plate 14a of the frame 12. The spring typically is a helical spring which is attached thereto the reel shaft 18 for biasing the reel 16 in a belt retraction direction, clockwise with respect to FIG. 2. This type of belt retraction mechanism is entirely conventional.

On the other side of the retractor 10, there a noise suppression mechanism 38 of the present invention which is efficiently utilizing space to be completely self-contained within the retractor 10. The noise suppression mechanism 38 is preferably located between the reel 16 and frame 12 and, more particularly, between the ratchet wheel 20b and the side plate 14b.

Since the present invention is concerned with noise suppression with respect to the ratchet mechanism 24, there, accordingly, are instances in which the ratchet mechanism 24 has a tendency to create noise or rattles as its components are subject to typical vehicle vibrations. While it is necessary for safety reasons to permit the ratchet mechanism 24 to operate in an unrestricted fashion in emergency situations, it would be desirable to suppress the ratchet mechanism 24 against noise and rattles in situations in which it is not necessary for it to prevent protraction of the seat belt, such as during periods in which the seat belt is not being used by an occupant.

In furtherance of this objective, the preferred noise suppression mechanism 38 operates between a neutral position (FIG. 3), and an actuated position (FIG. 2) in which the ratchet mechanism 24 is immobilized. The preferred noise suppression mechanism 38 is comprised generally of two components, namely a spring 42 and a blocking member or interlocking disc 44 (FIGS. 4–7) having a blockout portion or cam 46. The interlocking disc 44 is mounted on the reel shaft 18 between the ratchet wheel 20b and the side plate 14b for rotation, and the spring 42 uniformly biases the disc 44 against the ratchet wheel 20b and allows it to rotate along with the ratchet wheel 20b in response to protraction and retraction of the seat belt 19.

The disc 44 rotates between its actuated position, as shown in FIG. 2, in which the blockout cam 46 blocks the pawl 26 from pivoting up or down and, in particular, prevents the pawl teeth 30 from pivoting up and hitting the ratchet teeth 22, which would cause a metallic rattling noise. Thus, the blockout cam 46 may immobilize the ratchet mechanism 24 and quiet any rattles. In the neutral position, as shown in FIG. 3, the blockout cam 46 is rotated away from the pawl 26 which its pawl teeth 30 are now free to pivot into engagement with the ratchet wheels 20a and 20b to prevent protraction of the seat belt 19.

Turning now to FIGS. 4–7, the preferred interlocking disc 44 has a substantially circular, planar configuration defined by an outer annular edge 50 and a front surface 48a (FIG. 4) and a back surface 48b (FIG. 6). Projecting from the front surface 48a is a spring centering ring 52 for locating and maintaining the spring 42 and from the back surface 48b is a friction ring 54 (FIG. 5) for engaging the ratchet wheel 20b. The illustrated disc 44 is formed from a nylon material to have a general thickness of about 1.35 mm. to 1.45 mm. (FIG. 7) and a diameter of about 41 mm. to 43 mm.

At its center, the interlocking disc 44 has an aperture 56 through which the reel shaft 18 extends for rotatably mounting the disc 44. The illustrated aperture 56 has a diameter of about 11 mm. to 12 mm., which is only slightly larger than that of the reel shaft 18, and an inner annular surface 56a (FIG. 7) with a width of about 1.85 mm. to 2 mm., being slightly thicker than the disc 44. As a result, the aperture 56 receives the reel shaft 18 with as little clearance as possible between the inner annular surface 56a and the shaft 18 to assist in maintaining the disc 44 substantially vertical but, also, to allow the disc 44 to rotate freely on its surface 56a engaged with the reel shaft 18.

With reference to FIG. 4, the blockout cam 46 projects integrally and planarly from the disc 44 at the outer edge 50. The blockout cam 46 has a substantially rectangular configuration and, at its outer end, has an engaging edge 58 which engages the pawl 26 for immobilizing the ratchet mechanism 24. The blockout cam 46 is formed with identical material thickness, as viewed in elevation (FIG. 5), as the disc 44 and is defined by a pair of side edges 46a and 46b which are outwardly angled to increase the width of the blockout cam 46 proceeding outward to the engaging edge 58. The preferred blockout cam 46 has a material thickness of about 1.35 mm. to 1.45 mm. (FIG. 5), and, preferably, each of the side edges 46a and 46b continuously and arcuately extends from the outer edge 50 with a radius of curvature of about 2.5 mm. to 3.5 mm. in this instance.

As shown in FIG. 2, in order for the pawl 26 to pivot from its inoperative position in which the pawl 26 is resting under gravity, to its operative position, it swings through a gap between the pawl 26 and the ratchet teeth 22 of the ratchet wheels 20a and 20b. This gap is set to a predetermined dimension for insuring that the pawl 26 is able to effectively pivot into engagement with the ratchet teeth 22 to prevent the seat belt 19 from protracting. As with most dimensions, there is a plus and minus tolerance from the nominal gap dimensions.

Returning to FIG. 4, the preferred blockout cam 46 includes a curved engaging surface 60 at the engaging edge 58 for addressing the above-mentioned plus and minus tolerances. To accommodate such maximum tolerance condition, minimum tolerance condition and usual tolerance condition between these maximum and minimum conditions, the engaging surface 60 includes a minimum reach portion 60a, an arcuate intermediate reach portion 60b and a maximum reach portion 60c. In relation to the required regulation values, the minimum reach portion 60a engages a pawl spaced at or near the minimum value allowed, and, hence, the preferred minimum reach portion 60a is able to reach about 28 mm. to 29 mm. from a center location 62 of the disc 44. The maximum reach portion 60c engages a pawl spaced at or near the maximum value allowed, and, hence, the preferred maximum reach portion 60c is able to reach 28.5 mm. to 29.5 mm. from the center location 62 of the disc 44.

The intermediate reach portion 60b extends between the minimum reach portion 60a and the maximum reach portion 60c with an inwardly concave configuration for being able to reach a pawl spaced at any location between the minimum value and maximum value. For example, the preferred intermediate reach portion 60b has a radius of curvature of about 4.5 mm. to 5.5 mm. for being able to reach a pawl which is spaced any where between the minimum reach distance of the minimum reach portion 60a and the maximum reach distance of the maximum reach portion 60c.

As the disc 44 rotates in a clockwise direction from its neutral position (FIG. 3) to its actuated position (FIG. 2), the curved engaging surface 60 engages and cams against an upper pawl surface 64 (FIG. 3) of the pawl 26. To further facilitate such rotation, the blockout cam 46 engages the upper pawl surface 64 initially with its leading corner 66 located adjacent the minimum reach portion 60a. The leading corner 66 is formed from an intersection of the engaging edge 58 and the left side edge 46a and has a rounded configuration for effectively initiating a camming engagement between the curved engaging surface 60 of the blockout can 46 and the upper pawl surface 64.

As the disc 44 rotates further clockwise, the blockout cam 46, through its curved engaging surface 60, cams along the upper pawl surface 64 with first the minimum reach portion 60a and then the intermediate reach portion 60b. This camming continues along the curved engaging surface 60 toward the maximum reach portion 60c. The preferred disc 44 is only required to rotate about 71° to 13° from the time the leading corner 66 engages the upper pawl surface 64 to engage the maximum reach portion 60c with the upper pawl surface 64.

As shown in FIG. 2, the disc 44 is precluded from further rotation by either the blockout cam 46 becoming lodged against the pawl 26 or by a stop 68 (FIG. 5) which allows the disc 44 to rotate only through a predetermined rotation. When the blockout cam 46 becomes lodged, it engages the pawl 26 and pushes its plate portion 34 against the disc 36c of the inertial mechanism 36. This generally means that above described gap is insufficient for the blockout cam 46 to rotate through and, as a result, causes the disc 44 to lock-up. And in either case, the ratchet wheel 20b slides on the friction ring 54.

Turning now to FIGS. 4, 5 and 7, the stop 68 projects at a right angle from a stop support 70, located adjacent the outer edge 50, and as best shown in FIG. 4. As best shown in FIG. 7, the support 70 extends integrally and planarly from the edge 50 with the same material thickness as the disc 44. In this instance, the stop 68 projects normal from the stop support 70 with an arcuate rectangular configuration having an outwardly convex radius of curvature of about 23.5 mm. to 23.75 mm. as viewed in plan.

Referring now to FIG. 3, the stop 68 extends from the stop support 70 to and through the arcuate window 72 formed in the side plate 14b of the frame 12. The stop 68 includes a first stop surface 68a (FIG. 4) and a second stop surface 68b (FIG. 4) for, respectively, abutting a first window surface 72a and second window surface 72b of the arcuate window 72. For example, the first stop surface 68a and the first window surface 72a engage to prevent the disc 44 from rotating in the clockwise direction, and the second stop surfaces 68b and the second window surface 72b engage to prevent the disc 44 from rotating in the counter-clockwise direction.

The predetermined arc length for the arcuate window 72 is designed to restrict the disc's 44 rotation. As shown in FIG. 3, the disc 44 is only able to rotate in the counter-clockwise direction to position the blockout can 46 clear of the ratchet mechanism 24, and in the clockwise direction, the disc 44 is not able to rotate past its actuated position, thereby, being unable to engage the pawl 26. That is, the arc length need only permit the left edge 46a of the blockout cam 46 to rotate counterclockwise to a position in which it will not interfere with the ratchet mechanism 24 and to prevent the blockout cam 46 from rotating clockwise past the pawl 26 of the ratchet mechanism 24.

The stop 68, the blockout cam 46 and the window 72 are interrelated and designed to assure that the noise suppression mechanism 38 is always ineffective with belt protraction at the time of an accident and, yet, is effective to prevent rattling noise when the seat belt 19 is fully wound or has been extended about the passenger. When the seat belt 19 is fully retracted, the blockout cam 46 will be in its actuated position of FIG. 2, holding the pawl 26 down tight against the underlying inertial mechanism 36 and, more particularly, holding the disc 36c tight against the underlying annular ring 36f of the support 36d.

With the pawl 26 held tight against the inertial mechanism 36 and the disc 36c held tight against the underlying annular ring 36f of the support 36d, the unused and fully wound retractor should not rattle. On the other hand, whenever the belt 19 is protracted, either initially when the belt is pulled out to be brought about the occupant, or a further protraction by the occupant's body, as at the time of an accident, the disc 44 rotates counter-clockwise through a short range allowed for by the arcuate window 72 to the neutral position of FIG. 3. Now, the pawl 26 may lift to engage the ratchet wheels 20a and 20b and prevent further belt protraction. Thus, the disc 44 should never block out the pawl 26 at the time of belt protraction.

When the occupant first grasps the fully wound belt 19 and extends it, the disc 44 shifts from the blocking position of FIG. 2 to the neutral position of FIG. 3 in which the stop 68 is against the second stop surface 72b of the arcuate window 72. However, when buckling the belt 19, the belt retraction mechanism 40 retracts the belt 19 to be snug about the seat belt using occupant, and this slight retraction of the belt 19 rotates the disc 44 clockwise to the immobilizing position of FIG. 2. Thus, with the belt 19 about the occupant, the noise should be suppressed.

The preferred window 72 has a radius of curvature similar to that of the stop 68, and a predetermined arc length that limits the rotation of the disc 44 to a predetermined rotational angle. This rotational angle may be defined with respect to the center position 62 of the disc 44 as the angle between the first stop surface 68a of the stop 68 and the first window surface 72a of the window, when the disc 44 is in its neutral position, as shown in FIG. 3, in which the second stop surface 68b and the second window surface 72b are engaged to prevent counter-clockwise rotation. This angle is shown as reference character "A" and is about 25° to 30°, taking into account the width of the stop 68 and width of the blockout cam 46. This angle defines the maximum rotation allowed for the disc 44 to ensure that the disc will effectively rotate between its neutral position and actuated position.

The stop 68 should have a width wide enough to provide sufficient strength to prevent the stop 68 from becoming damaged and losing its effectiveness. This includes preventing any damage that may occur from initial impact with the surfaces 72a and 72b of the arcuate window 72 and during instances when the stop 68 prevents the disc 44 from rotating. The stop 68 also should have a length which enables it to extend to and through the arcuate window 72 in the frame 12, and hence, the preferred length is about 7.0 mm. to 7.5 mm.

Returning to FIG. 4 and 7, a spring centering ring 52 projects from the front surface 48a for centering and maintaining the spring 42 with respect to the disc 44. The spring centering ring 52 is centrally located on the front surface 48a and includes an inner annular wall 74 projecting to a rim 76. Herein, the rim 76 is defined by an inner diameter of about 20.5 mm. to 22.5 mm. and may change depending on the diameter of the preferred spring and/or reel shaft. The inner annular wall 74 projects with a height sufficient to engage and maintain the spring 42 as the disc 44 rotates with the ratchet wheel 20b, and for example, the preferred wall 74 has a height of about 1 mm. to 1.5 mm. with respect to an inner base surface 78 which also, preferably, projects above the front surface 48a within the spring centering ring 52 about 0.50 mm. to 0.60 mm.

Turning now to FIG. 6 and 7, a friction ring 54 projects from the back surface 48b for interengaging the ratchet wheel 20b for rotation therewith and for sliding with respect to the ratchet wheel 20b when the disc 44 is restrained, such as by the stop 68, against rotation. The friction ring 54 is centrally located about the back surface 48b and includes a rim 80 having an engaging surface 82 for engaging an outer surface 84 of the ratchet wheel 20b (FIG. 1). When the spring 42 uniformly biases the disc 44 against the ratchet wheel 20b, the engaging surface 82 of the friction ring 54 and the outer surface 84 of the ratchet wheel 20b mate with a frictional engagement. The frictional engagement forces the disc 44 to rotate with the ratchet wheel 20b upon belt protraction and retraction and enables the disc 44 to slide when it is prevented from rotating. The ring 54, in this instance, projects about 0.45 mm. 0.55 mm. from the back surface 48b and the engaging surface 82 is defined by an inner radius of about 34.5 mm. to 36 mm. and an outer radius of about 39 mm. to 40 mm.

As is described in detail below, these particular dimensions size the engaging surface 82 of the friction ring 54 in a manner to form a sufficient frictional engagement with the ratchet wheel 20b to facilitate precise rotation therewith and, when necessary, to overcome any obstructing forces in order to initiate and continue such rotation.

Turning again to FIG. 1, the spring 42, typically a conical spring through which the reel shaft 18 extends, uniformly biases the disc 44 against the ratchet wheel 20b. The spring 42 is compressed between the disc 44 and the side plate 14b to generate the biasing force. Specifically, the spring 42 has a first end 42a which is tapered to fit snug around the spring centering ring 52 and a second end 42b to abut the inner side of the side plate 14b.

This biasing force must be sufficient to facilitate an engagement with the ratchet wheel 20b that will overcome any obstructing forces, including any frictional forces between the disc 44 and the reel shaft 18 and the blockout cam 46 and the upper pawl surface 64, when the disc 44 rotates between its neutral position and actuated position.

Both the spring centering ring 52 and the friction ring 54 include a dust drop slot 86a (FIG. 4) and 86b (FIG. 6), respectively. These slots 86a and 86b are formed by providing a break in each ring 52 and 54 to allow dust accumulating between the interlocking disc 44 and either the spring 44 or the ratchet wheel 20b to fall out.

In operation as illustrated with reference to FIGS. 2 and 3, the present noise suppression mechanism 38 rotates between its actuated position of FIG. 2 and its neutral position of FIG. 3. When the belt 19 is fully wound and unused to restrain an occupant, the blockout cam 46 is positioned in its actuated position in which it engages the pawl 26 to immobilize the ratchet mechanism 24 for quieting any noise which may be caused by any free movement.

As the belt 19 is protracted, the reel 16 and the ratchet wheels 20a and 20b rotate counter-clockwise. The frictional engagement between the ratchet wheel 20b and the friction ring 54 rotates the disc 44 from its actuated position to its neutral position in which the blockout cam 46 is spaced from the ratchet mechanism 24 in which the pawl 26 is only biased under gravity and may operate freely.

As the disc 44 rotates counter-clockwise, the stop 68, as shown in FIG. 2, also moves within the arcuate window 72, and when a predetermined amount of rotation occurs, which is sufficient to position the blockout cam 46 clear of the ratchet mechanism, the first stop surface 68a engages the first engaging surface 72a of the arcuate window 72 to prevent the disc 44 from further rotating with the ratchet wheel 20b. Any further protraction of the belt 19 for securing around an occupant renders the outer surface 84 of the ratchet wheel 20b sliding upon the engaging surface 82 of the friction ring 54 on the disc 44.

In the process of securing the belt 19 about the occupant's torso, the belt 19 retracts slightly with the reel turning in the clockwise direction to its operative position. Thus, with the ratchet wheel 20b rotated clockwise, the disc 44 immobilizes the pawl 26 and prevents it from rattling while the belt is being utilized for occupant restraint.

When the occupant wishes to remove the belt 19, the disc 44 remains in its actuated position to prevent locking of the ratchet wheels during belt retraction. This allows the remaining protracted belt to be retracted with the ratchet mechanism 24 immobilized and quieted against any rattles.

Once the belt 19 is fully wound, the disc 44 is prevented from unintentionally rotating away from its actuated position as a result of the biasing force exerted by the spring 42. This continues until the belt 19 is protracted again, such as for occupant use. Because the disc 44 is in its actuated position, the second stop surface 68b may engage the second window surface 72b of the arcuate window 72 to prevent the disc 44 from further rotating with the ratchet wheel 20b. Because the arc length is designed to prevent the blockout cam 46 from rotating past the pawl 26, it is still able to blockout the pawl 26 and immobilize the ratchet mechanism 24 to quiet rattles.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A seat belt retractor for a vehicle comprising:
a retractor frame;

a reel having a reel shaft journaled for rotation in the retractor frame and having a seat belt wound thereon;

a retractor spring supported by the retractor frame, the retractor spring being connected to the reel shaft for biasing the reel in a belt retraction direction and for permitting the belt to rotate the reel in a belt protraction direction as it is unwound from the reel;

a ratchet wheel being coupled to the reel for rotation therewith and having ratchet teeth disposed thereon;

a locking pawl being pivotally mounted on the retractor for rotation between an inoperative position in which the pawl is spaced from the ratchet teeth and an operative position in which the pawl is engaged with the ratchet teeth to lock the reel against rotation in the belt protraction direction;

an inertial mechanism for actuating the locking pawl being responsive to a predetermined change in acceleration on the vehicle to move the locking pawl to its operative position; and a noise suppression mechanism including a blocking member being mounted on the reel shaft for rotation relative to the reel shaft and being moveable with the ratchet wheel for rotation between an actuated position for immobilizing the locking pawl against rattling and a neutral position allowing the locking pawl to pivot freely, a stop on the frame for limiting movement of the blocking member to rotate only through a predetermined range, a spring biasing the blocking member into engagement with the ratchet wheel, and the blocking member having a blockout portion for immobilizing the pawl when rotated into its actuated position to prevent the pawl from bouncing against the ratchet wheel and making noise and a first side, the first side having a spring centering ring for locating and maintaining the spring centrally with the disc.

2. A seat belt retractor in accordance with claim 1 wherein the spring includes a conical spring having the reel shaft extending therethrough.

3. A seat belt retractor in accordance with claim 1 wherein the blocking member has a second side with a friction ring, the friction ring engaging the ratchet wheel for rotating the blocking member therewith and allowing the blocking member to slide with respect to the ratchet wheel.

4. A seat belt retractor in accordance with claim 1 wherein the blocking member is frictionally interengaged with the ratchet wheel for rotation therewith.

5. A seat belt retractor for a vehicle comprising:
a retractor frame;
a reel having a reel shaft journaled for rotation in the retractor frame and having a seat belt wound thereon;

a retractor spring supported by the retractor frame, the retractor spring being connected to the reel shaft for biasing the reel in a belt retraction direction and for permitting the belt to rotate the reel in a belt protraction direction as it is unwound from the reel;

a ratchet wheel being coupled to the reel for rotation therewith and having ratchet teeth disposed thereon;

a locking pawl being pivotally mounted on the retractor for rotation between an inoperative position in which the pawl is spaced from the ratchet teeth and an operative position in which the pawl is engaged with the ratchet teeth to lock the reel against rotation in the belt protraction direction;

an inertial mechanism for actuating the locking pawl being responsive to a predetermined change in acceleration on the vehicle to move the locking pawl to its operative position; and a noise suppression mechanism including a blocking member being mounted on the reel shaft for rotation relative to the reel shaft and being moveable with the ratchet wheel for rotation between an actuated position for immobilizing the locking pawl against rattling and a neutral position allowing the locking pawl to pivot freely, a stop on the frame for limiting movement of the blocking member to rotate only through a predetermined range, the blocking member having a blockout portion for immobilizing the pawl when rotated into its actuated position to prevent the pawl from bouncing against the ratchet wheel and making noise, and the blockout portion comprising a cam, the cam comprising a curved surface for engaging the pawl and the curved surface having a minimum reach point, an intermediate sloped reach portion and a maximum reach point for engaging the pawl when at different distances from the ratchet wheel.

6. A seat belt retractor for a vehicle comprising:
a retractor frame;
a reel having a reel shaft journaled for rotation in the retractor frame and having a seat belt wound thereon;

a retractor spring supported by the retractor frame, the retractor spring being connected to the reel shaft for biasing the reel in a belt retraction direction and for permitting the belt to rotate the reel in a belt protraction direction as it is unwound from the reel;

a ratchet wheel being coupled to the reel for rotation therewith and having ratchet teeth disposed thereon;

a locking pawl being pivotally mounted on the retractor for rotation between an inoperative position in which the pawl is spaced from the ratchet teeth and an operative position in which the pawl is engaged with the ratchet teeth to lock the reel against rotation in the belt protraction direction;

an inertial mechanism for actuating the locking pawl being responsive to a predetermined change in acceleration on the vehicle to move the locking pawl to its operative position; and a noise suppression mechanism including a blocking member being mounted on the reel shaft for rotation relative to the reel shaft and being moveable with the ratchet wheel for rotation between an actuated position for immobilizing the locking pawl against rattling and a neutral position allowing the locking pawl to pivot freely, a stop on the frame for limiting movement of the blocking member to rotate only through a predetermined range, a spring biasing the blocking member into engagement with the ratchet wheel, and the blocking member having a blockout portion for immobilizing the pawl when rotated into its actuated position to prevent the pawl from bouncing against the ratchet wheel and making noise and having a first dust slot through which dust particles accumulating between the blocking member and the ratchet wheel may travel radially and a second dust slot through which dust particles accumulating between the blocking member and the spring may travel radially.

* * * * *